FIG. 3

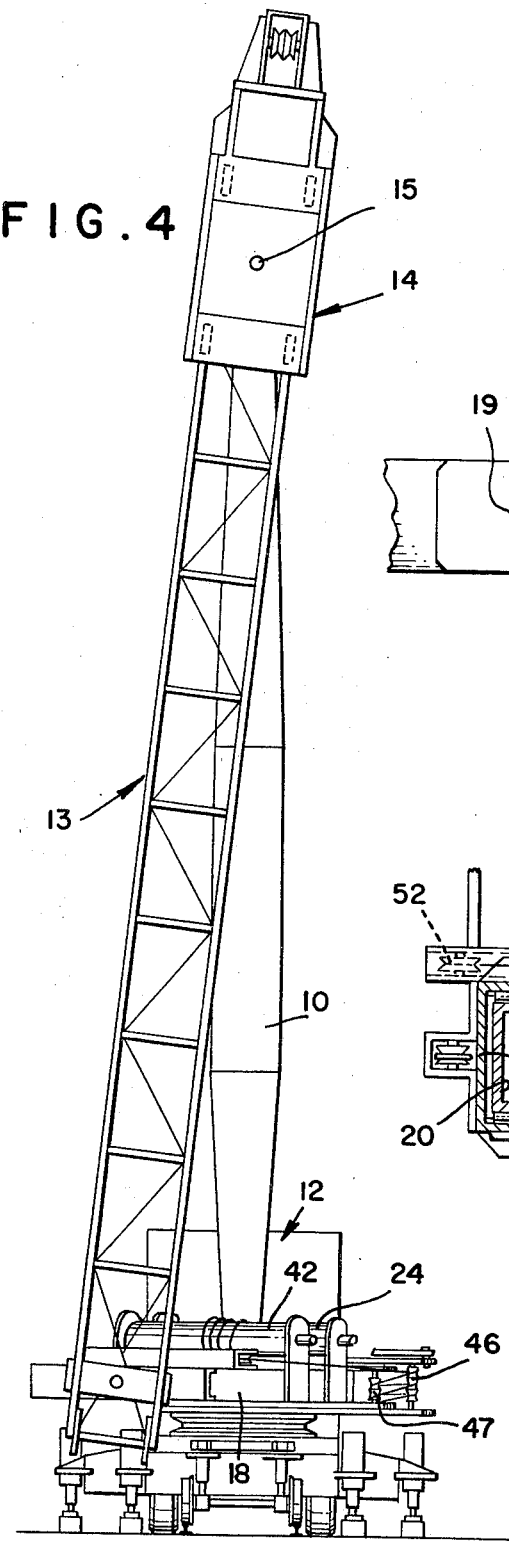
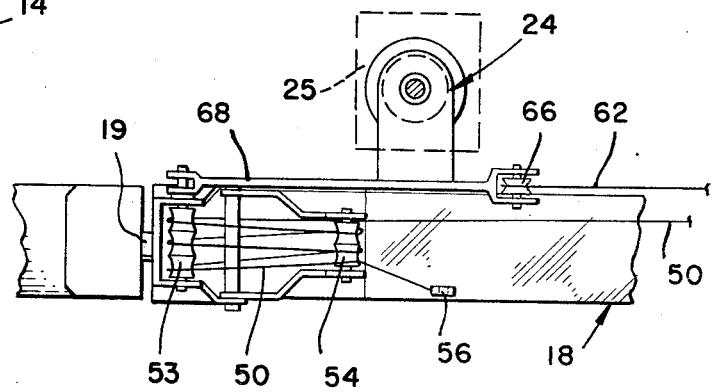
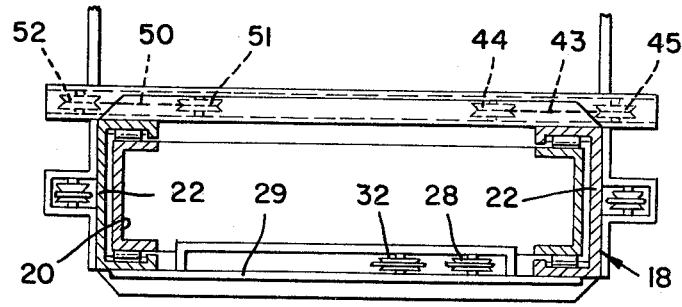
FIG. 4
FIG. 5
FIG. 6
INVENTOR.
JAMES O. MILLER

May 12, 1970 J. O. MILLER 3,511,320
BOTTOM BRACE WITH REVERSELY ACTING POWER CABLE CONNECTIONS FOR
SHIFTING AND HOLDING PILE HAMMER LEADS FORWARD AND BACKWARD
AND IN LATERALLY INCLINED BATTER POSITIONS
Filed Dec. 3, 1968 5 Sheets-Sheet 5

INVENTOR.
JAMES O. MILLER
BY
ATTORNEY

United States Patent Office 3,511,320
Patented May 12, 1970

3,511,320
BOTTOM BRACE WITH REVERSELY ACTING POWER CABLE CONNECTIONS FOR SHIFTING AND HOLDING PILE HAMMER LEADS FORWARD AND BACKWARD AND IN LATERALLY INCLINED BATTER POSITIONS
James O. Miller, Cranford, N.J., assignor to Horn Construction Co. Inc., Merrick, N.Y., a corporation of New York
Filed Dec. 3, 1968, Ser. No. 780,797
Int. Cl. E02d 7/14, 13/04
U.S. Cl. 173—43                                6 Claims

ABSTRACT OF THE DISCLOSURE

Pile hammer leads are shifted outward and inward and to either side by pull cables extending from opposite sides of reversible drums and acting to hold the leads during shifting movements as well as in finally adjusted positions.

---

Objects of the invention have been to provide compact, simple, powerful means which could be mounted on a bottom brace to shift and at all times to securely hold pile hammer leads in different angles of adjustment.

These and other desirable objects have been accomplished by a novel combination and arrangement of cables connected to operate through pulley systems to apply pulling and holding forces to the hammer leads.

Other important novel features of the invention are set forth and will appear in the course of the following specification.

The drawings accompanying and forming part of the specification illustrate a practical embodiment of the invention, but the structure may be modified and changed all within the intent and scope of the invention as hereinafter described and claimed.

FIG. 1 in the drawings is a side elevation of a pile hammer having the invention incorporated in the bottom brace.

FIG. 3 is a general plan view showing cable connections omitted in FIG. 2.

FIG. 4 is a front elevation showing the leads swung to one side.

FIG. 5 is a broken detail of the cable connections as viewed in the direction of the arrows 5—5 in FIG. 3.

FIG. 6 is a broken cross section on substantially the plane of line 6—6 of FIG. 3.

Figure 1:
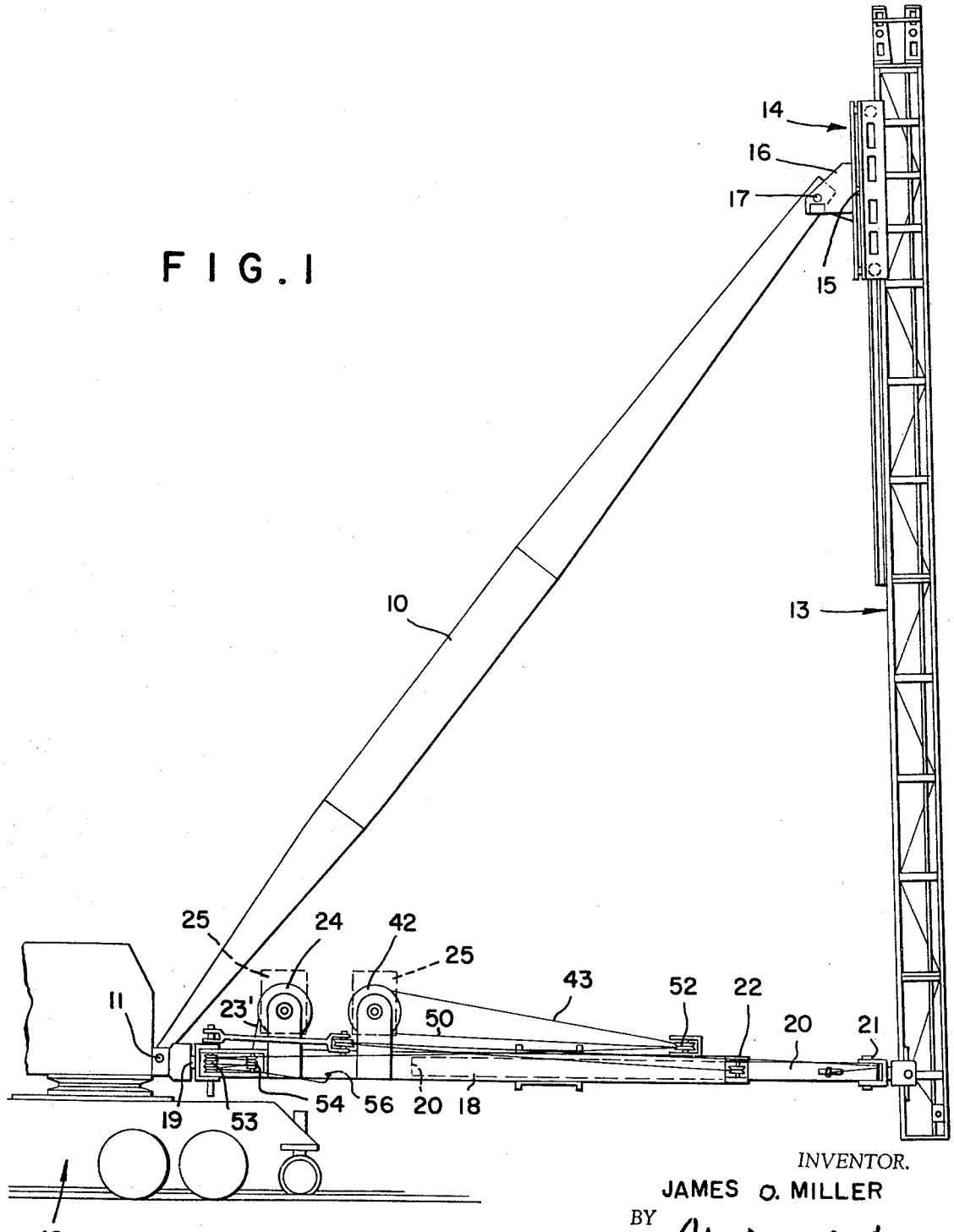

The drawings illustrate the invention in a railroad crane, FIG. 1, having a boom 10 pivoted at the lower end at 11 to the cab or base 12 of the machine.

The leads frame for the pile hammer is designated 13 and is shown slidingly guided at the top in a guiding and supporting head 14, which is pivoted at 15 for lateral swinging movement on a boom hook frame 16 engaged over the boom end pin 17.

Figure 2:
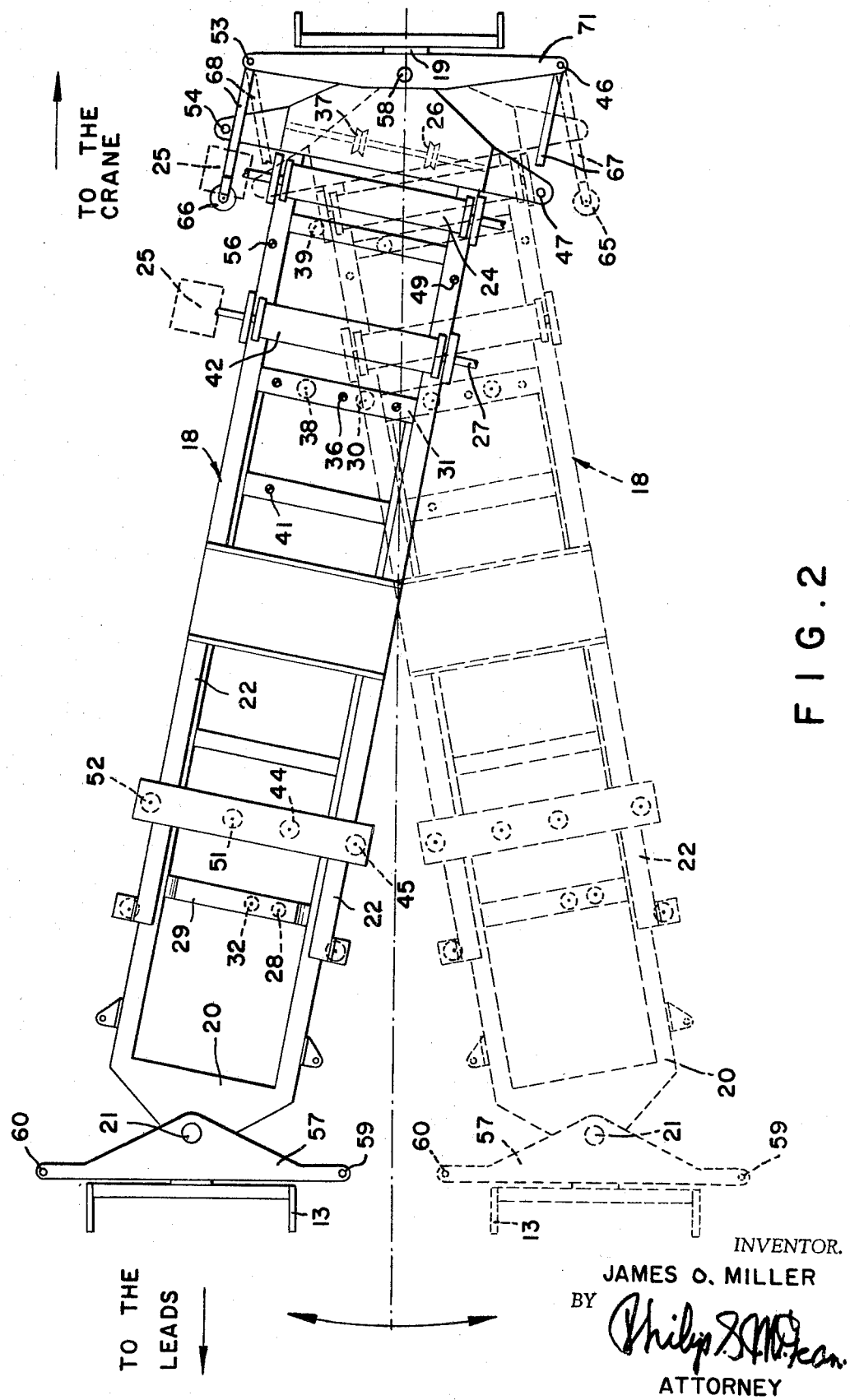
FIG. 2 is a plan view of the bottom brace as on substantially the line 2—2 of FIG. 1, parts broken away or omitted and showing the brace swung to opposite sides of a center line.

This construction enables the leads to be swung forward and back from a vertical position, FIG. 2, and to be swung laterally from side to side, FIG. 4.

The bottom brace is made up of a rigid frame 18, pivoted at its inner end to the base of the crane by a universal joint connection 19, and carrying at the outer end an extension 20 having a universal joint connection 21 with the lower end of the leads frame.

The extension piece 20 is shown slidably mounted in the frame by being engaged in the spaced channel beams 22 forming the opposite sides of the frame.

The slide is projected and retracted to extend or withdraw the leads by cables 23 and 24, wrapped about a power driven drum 24 and connected one to pull the slide outwardly and the other to pull the slide inwardly of the frame.

The drum may be driven by a reversible geared air motor indicated at 25, thus to avoid the complications of electric or hydraulic forms of drive and the cables may be entirely separate cables or a single cable connected middlelength to the drum and having opposite end portions wrapped about the drum in the same direction so as to get the effect of one cable paying out while the other cable is winding on the drum.

Figure 7:
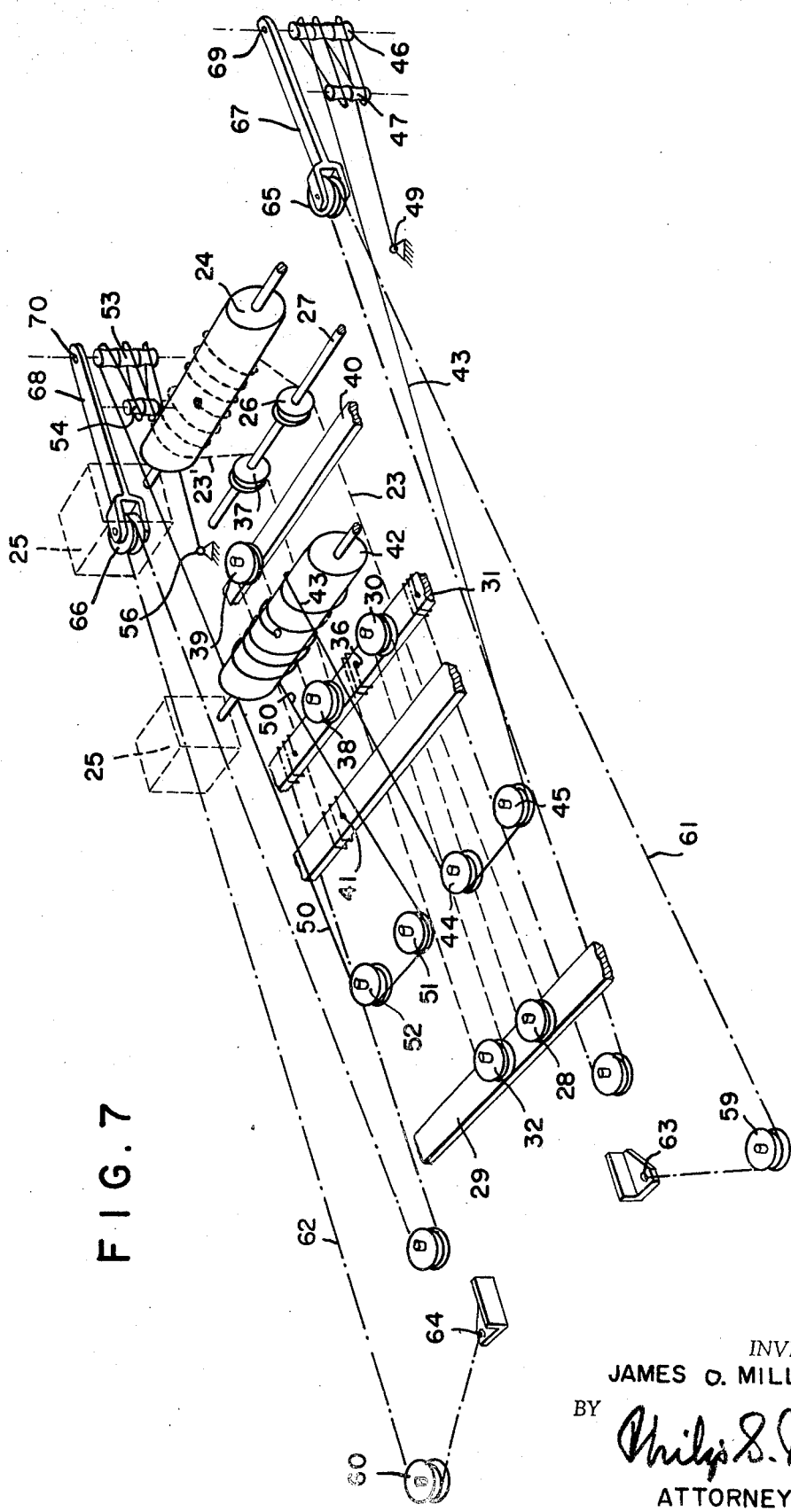
FIG. 7 is a perspective diagrammatic view illustrating operation of the cable connections.

As shown in the diagrammatic view, FIG. 7, the cable 23 for extending the leads runs from the far side of the drum over a loose guide pulley 26 freely slideable and rotatable over a supporting shaft 27, to a pulley 28 on a cross bar 29 of the frame, and back over a pulley 30 journalled on the cross bar 31 on the inner end of the moveable section and from that pulley over a pulley 32 journalled on the cross bar 29 on the outer end of the slide and back to a point of connection at 36 on the inner end of the slide so that through this pulley system the tuning of drum 25 lefthandedly will apply pull on cable 23 to pull the moveable frame extension outwardly and thus project the leads forwardly, away from the crane.

The reverse effect is obtained by rotation of the drum righthandedly, in FIG. 7 to exert pull on cable 24 which extends over sliding guide pulley 37, about pulley 38 on the inner end of the sliding extension and thence back about pulley 39 on cross bar 40 on the inner end of the rigid frame and thence outwardly to a point of connection at 41, on the inner end of the sliding extension.

This particular cable system operates to withdraw and shift the leads inwardly upon rotation of drum 24 in the righthanded direction.

Shifting of the leads laterally for batter adjustment is effected from a second power actuated reversible drum 42, FIG. 7, carrying one cable 43 extending from the top of the drum over pulley 44 on the outer end of the frame and an outer pulley 45 back to and about companion pulleys 46 and 47 mounted respectively on the stationary base structure and on a projecting leverage arm 48 on the side of the pivoted frame, this line being then dead-ended on the frame at 49; the other reversely acting cable 50 running over pulleys 51, 52 back about the companion sets of pulleys 53, 54 on the base and projecting leverage arm 55 to a point of anchorage 56 on the frame.

Rotation of the drum 42 in righthanded direction, winding on cable 43 will thus effect swinging movement of the brace, carrying the leads to the left and reverse rotation of drum 42 in the lefhanded direction will have the effect of winding on the cable 50 to pull the frame and the leads toward the right.

To keep the hammer properly lined up with the sheet piling being driven, a double ended lever 57 is pivoted at 58 on the outer end of the frame extension carrying pulleys 59, 60 at its ends over which cables 61, 62 are looped, connected at their outer ends at 63, 64 to the outer end of the extension slide and run back over pulleys 65, 66 on links 67, 68 connected at 69, 70 with the extended ends of the pivot bracket 71.

As the brace is turned to one side or the other, these connections will operate to rotate the leads frame on the vertical axis to maintain the hammer in alignment with the row of piling being driven.

The several adjustments operate jointly and selectively independently of each other and without interference between them.

The oppositely acting cables may be connected in tension so as to at all times exert holding of the leads in selected position and automatic or manually controlled brake means may be provided for holding the drums in adjusted position.

The cable connections take up small space, provide adequate power for shifting and holding the leads and the cable lines may be readily repaired or replaced and may be concealed or protected by suitable cover structure.

All mechanism including the power driven reversible drum and cable connections is mounted on the frame or beam structure in compact relation taking up small space.

The cable and pulley combinations provide ample power and enable the use of small drum motors and small size wire rope as cable.

While the air motor form of drive for the cable drums may generally be preferred, it will be realized that other forms of power drive may be employed.

Power development is effected by lacing the cable lines about oppositely disposed pairs of pulleys on the brace frame and extension slide and also on the frame and supporting base structure, relatively simple and inexpensive structure for accomplishing such results.

In practice the oppositely acting cables of each pair are tensioned to hold and control the leads free of backlash.

What is claimed is:

1. Bottom brace for the leads of a pile hammer comprising in combination with a leads frame pivotally supported for swinging movement outward and inward and laterally to opposite sides of a common center line,
   a rigid brace frame pivotally supported at its inner end and having a longitudinally shiftable extension at its outer end pivotally connected with the lower end of the leads frame,
   a reversible motor operated drum mounted on said rigid frame, and
   cables on and extending from opposite sides of said drum and connected one to pull said extension outwardly and the other connected to pull said extension inwardly in respect to said pivotal mounting of the leads frame.

2. The invention according to claim 1 with a second power actuated reversible drum mounted on said brace frame and cables on and extending from opposite sides of said second drum and connected to pull said brace frame to opposite sides of a common center line.

3. The invention according to claim 2 with a lever pivotally mounted on the outer end of said extension and connected to shift said leads frame about a vertical axis and
   cable connections from opposite ends of said lever back to said frame extension for rocking said lever on the vertical axis to face said leads frame in line with a stand of piling being driven.

4. The invention according to claim 1 with a lever pivotally mounted on the outer end of said extension and connected to shift said leads frame about a vertical axis and
   cable connections from opposite ends of said lever back to said frame extension for rocking said lever on the vertical axis to face said leads frame in line with a stand of piling being driven.

5. Bottom brace for the leads of a pile hammer, comprising in combination with a leads frame pivotally supported at the top for movement outward and inward and laterally to opposite sides of a common center line,
   a rigid brace frame pivotally supported at the inner end of the same,
   a longitudinally shiftable extension projecting from the outer end of said frame.
   a pivotal connection between said extension and the lower end of said leads frame,
   oppositely disposed pairs of pulleys on said frome and extension,
   cables looped about different pairs of said pulleys and disposed one cable to extend said longitudinally shiftable extension, and
   another cable looped about other pairs of said pulleys and disposed to effect retraction of said extension and thereby arranged to effect the extension and retraction of the lower end of the leads frame and motor driven means for applying tension to the respective cable lines.

6. The invention according to claim 5 with supporting structure for the pivoted inner end of said frame,
   opposed pairs of pulleys on said supporting structure and pivoted frame,
   cables laced over said last mentioned pairs of pulleys and disposed to impart laterally swinging adjustment of the frame and
   power mechanism for selectively tensioning said last mentioned cable lines.

References Cited
UNITED STATES PATENTS

| | | | |
|---|---|---|---|
| 468,486 | 2/1892 | Fobes | 173—44 X |
| 1,395,895 | 11/1921 | Bellony | 173—43 |
| 2,598,454 | 5/1952 | Smith | 173—43 X |
| 2,711,078 | 6/1955 | Guild | 173—43 |
| 2,732,197 | 1/1956 | Cornett | 173—43 X |
| 2,998,856 | 9/1961 | Larsen et al. | 173—43 |

ERNEST R. PURSER, Primary Examiner

U.S. Cl. X.R.

52—116; 173—28